United States Patent
Pettersson (10) Patent No.: US 10,148,880 B2
(45) Date of Patent: Dec. 4, 2018

(54) METHOD AND APPARATUS FOR VIDEO CONTENT STABILIZATION

(71) Applicant: Microsoft Technology Licensing, LLC, Redmond, WA (US)

(72) Inventor: Gustaf Pettersson, Ljungbyhed (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/090,497

(22) Filed: Apr. 4, 2016

(65) Prior Publication Data

US 2017/0289454 A1 Oct. 5, 2017

(51) Int. Cl.
*H04N 5/232* (2006.01)

(52) U.S. Cl.
CPC ..... *H04N 5/23267* (2013.01); *H04N 5/23258* (2013.01); *H04N 5/23287* (2013.01)

(58) Field of Classification Search
CPC ............. H04N 5/23267; H04N 5/2257; H04N 5/23258; H04N 5/23287
See application file for complete search history.

(56) References Cited

U.S. PATENT DOCUMENTS

| | | | |
|---|---|---|---|
| 5,619,030 A | 4/1997 | Shiomi | |
| 7,548,689 B2 | 6/2009 | Yap et al. | |
| 8,170,408 B2 | 5/2012 | Nasiri et al. | |
| 8,587,673 B2 * | 11/2013 | McLeod | H04N 5/23248 348/208.2 |
| 8,704,899 B2 | 4/2014 | Hong et al. | |
| 2005/0057662 A1 | 3/2005 | Washisu | |
| 2007/0025710 A1 * | 2/2007 | Shin | H04N 5/2253 396/55 |
| 2007/0115349 A1 | 5/2007 | Currivan et al. | |
| 2008/0100716 A1 | 5/2008 | Fu et al. | |
| 2009/0001170 A1 * | 1/2009 | He | G06K 7/10722 235/462.41 |
| 2011/0105181 A1 | 5/2011 | McLeod | |
| 2013/0147976 A1 | 6/2013 | Noguchi | |

(Continued)

OTHER PUBLICATIONS

Windau, et al., "Multilayer Real-Time Video Image Stabilization", In Proceedings of International Conference on Intelligent Robots and Systems, Sep. 25, 2011, pp. 2397-2402.

(Continued)

*Primary Examiner* — Padma Haliyur (57) ABSTRACT

A method and an apparatus for video content stabilization are presented. The method includes causing capture of a series of image frames of a video by a camera. The video is captured by detecting a movement of the camera during capture of each image frame and effecting optical image stabilization to compensate for the detected movement. At least one of a lens assembly and an image sensor is reset to a pre-capture position subsequent to the capture of the each image frame. The method further includes performing digital image stabilization (DIS) for an image frame based on the movement of the camera detected for the image frame and the movement of the camera detected for at least one other image frame. The DIS is performed for one or more image frames to substantially remove an effect of the movement of the camera from the one or more image frames.

20 Claims, 6 Drawing Sheets

(56) References Cited

U.S. PATENT DOCUMENTS

2015/0036010 A1 2/2015 Wu et al.
2015/0071617 A1 3/2015 Kauhanen

OTHER PUBLICATIONS

Karpenko, et al., "Digital Video Stabilization and Rolling Shutter Correction using Gyroscopes", In Stanford University Computer Science Technical Report CSTR Mar. 2011, Sep. 2011, pp. 1-7.

Park, et al., "Gyro-Based Multi-Image Deconvolution for Removing Handshake Blur", In Proceedings of IEEE Conference on Computer Vision and Pattern Recognition, Jun. 23, 2014, 8 pages.

"What's new in AV Foundation Capture for iPhone 6s, iPhone 6s Plus, and iOS 9", Retrieved on: Jan. 4, 2016, 15 pages, Available at: https://forums.developer.apple.com/thread/21694.

Purcher, Jack, "Apple's iPhone 6-Plus Optical Image Stabilization Invention Comes to Light", Published on: Jul. 9, 2015, 4 pages, Available at: http://www.patentlyapple.com/patently-apple/2015/07/apples-iphone-6-plus-optical-image-stabilization-invention-comes-to-light.html.

Hein, Buster, "The Best Reason to Upgrade to iPhone 6s Plus: Optical Image Stabilization", Published on: Sep. 24, 2015, 3 pages, Available at: http://www.cultofmac.com/390139/optical-image-stabilization-iphone/.

He, et al., "Digital Video Stabilization based on Hybrid Filtering", In Proceedings of 7th International Congress on Image and Signal Processing, Oct. 14, 2014, pp. 94-98.

Allen, John "Mover and Shaker", "Image Stabilization for Bicycle Video", Published on: Sep. 6, 2012, 7 pages, Available at: http://www.sheldonbrown.com/image-stabilization.html.

Raut, et al., "Real-Time Optical Image Stabilization using High Frame Rate Video Sequence at 500 Fps", In Proceedings of Conference on Advances in Robotics, Jul. 2, 2015, 6 pages.

"Aakash Sharma loves to vlog on his Lumia 640 XL and Lumia 930, encouraging his friends to switch to Windows Phone with his videos.", Published on: Jul. 6, 2015, 5 pages, Available at: https://blogs.windows.com/devices/2015/07/06/how-to-be-a-vlogger-with-lumia/.

"Camera Comparison: Microsoft Lumia 950 XL vs Samsung Galaxy S6 edge+", Retrieved on: Jan. 4, 2016, 5 pages, Available at: https://www.reddit.com/r/windowsphone/comments/3viqk0/camera_comparison_microsoft_lumia_950_xl_vs/.

"International Search Report and Written Opinion Issued in PCT Application No. PCT/US2017/024649", dated Jul. 4, 2017, 12 Pages.

* cited by examiner

502 — CAUSE CAPTURE OF A SERIES OF IMAGE FRAMES OF A VIDEO BY A CAMERA, THE CAMERA COMPRISING A LENS ASSEMBLY AND AN IMAGE SENSOR, WHEREIN CAPTURE OF EACH IMAGE FRAME FROM AMONG THE SERIES OF IMAGE FRAMES INVOLVES PERFORMING STEPS OF:

- DETECTING MOVEMENT OF THE CAMERA DURING THE CAPTURE OF THE EACH IMAGE FRAME
- EFFECTING OPTICAL IMAGE STABILIZATION (OIS) FOR THE EACH IMAGE FRAME TO COMPENSATE FOR THE DETECTED MOVEMENT OF THE CAMERA
- RESETTING AT LEAST ONE OF THE LENS ASSEMBLY AND THE IMAGE SENSOR TO A PRE-CAPTURE POSITION SUBSEQUENT TO THE CAPTURE OF THE EACH IMAGE FRAME

504 — PERFORM DIGITAL IMAGE STABILIZATION (DIS) FOR ONE OR MORE IMAGE FRAMES OF THE VIDEO SUBSEQUENT TO THE CAPTURE OF THE SERIES OF IMAGE FRAMES OF THE VIDEO, WHEREIN THE DIS FOR AN IMAGE FRAME IS PERFORMED BASED ON THE MOVEMENT OF THE CAMERA DETECTED FOR THE IMAGE FRAME AND THE MOVEMENT OF THE CAMERA DETECTED FOR AT LEAST ONE OTHER IMAGE FRAME FROM AMONG THE SERIES OF IMAGE FRAMES, AND, WHEREIN PERFORMING OF THE DIS SUBSTANTIALLY REMOVES AN EFFECT OF THE MOVEMENT OF THE CAMERA FROM THE ONE OR MORE IMAGE FRAMES OF THE VIDEO

506 — CAUSE DISPLAYING OF THE VIDEO ON A DISPLAY SCREEN OF AN ELECTRONIC DEVICE SUBSEQUENT TO PERFORMING OF THE DIS FOR THE ONE OR MORE IMAGE FRAMES OF THE VIDEO

METHOD AND APPARATUS FOR VIDEO CONTENT STABILIZATION

TECHNICAL FIELD

The present application generally relates to video capture mechanisms, and more particularly to a method and apparatus for stabilizing video content captured by a camera.

BACKGROUND

Generally, undesirable artefacts are observed in captured image frames if a camera moves while capturing the image frames. The camera may move on account of a shake of a hand holding the camera, or in some cases, a user holding the camera may pan or sweep the camera while capturing the image frames. As a result, undesirable artefacts like blurred objects of the captured scene are observed in the image frames.

Typically, image capture mechanisms employ various techniques to compensate for movement of the camera during image frame capture to obtain sharper image frames. However, these techniques, by themselves are capable of addressing only minor movements of the camera during image capture. For example, current techniques are incapable of sufficiently compensating relatively major movements of the camera, such as for example a panning or a sweeping motion of the camera during image capture. As a result, undesirable artefacts, like motion-blurred objects are only partly addressed in the captured image frames.

The embodiments described below are not limited to implementations, which solve any or all of the disadvantages of known devices.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

In an embodiment, a method for video content stabilization is presented. The method includes causing capture of a series of image frames of a video by a camera. The camera comprises a lens assembly and an image sensor. The capture of each image frame from among the series of image frames involves performing operations of: (a) detecting a movement of the camera during the capture of the each image frame; (b) effecting optical image stabilization (OIS) for the each image frame to compensate for the detected movement of the camera; and (c) resetting at least one of the lens assembly and the image sensor to a pre-capture position subsequent to the capture of the each image frame. The method further includes performing digital image stabilization (DIS) for one or more image frames of the video subsequent to the capture of the series of image frames of the video. The DIS for an image frame from among the one or more image frames is performed based on the movement of the camera detected for the image frame and the movement of the camera detected for at least one other image frame from among the series of image frames. The performing of the DIS for the one or more image frames substantially removes an effect of the movement of the camera from the one or more image frames of the video.

In an embodiment, an apparatus for video content stabilization is presented. The apparatus includes at least one processor and at least one memory. The at least one memory includes computer program code. The at least one memory and the computer program code are configured to, with the at least one processor, cause the apparatus to capture a series of image frames of a video by a camera. The camera comprises a lens assembly and an image sensor. The capture of each image frame from among the series of image frames involves performing operations of: (a) detecting a movement of the camera during the capture of the each image frame; (b) effecting optical image stabilization (OIS) for the each image frame to compensate for the detected movement of the camera; and (c) resetting at least one of the lens assembly and the image sensor to a pre-capture position subsequent to the capture of the each image frame. The apparatus is further caused to perform digital image stabilization (DIS) for one or more image frames of the video subsequent to the capture of the series of image frames of the video. The DIS for an image frame from among the one or more image frames is performed based on the movement of the camera detected for the image frame and the movement of the camera detected for at least one other image frame from among the series of image frames. The performing of the DIS for the one or more image frames substantially removes an effect of the movement of the camera from the one or more image frames of the video.

In an embodiment, a computer program product for facilitating display based on a display priority is presented. The computer program product includes at least one computer-readable storage medium. The computer-readable storage medium includes a set of instructions, which, when executed by one or more processors, cause an apparatus to capture a series of image frames of a video by a camera. The camera comprises a lens assembly and an image sensor. The capture of each image frame from among the series of image frames involves performing operations of: (a) detecting a movement of the camera during the capture of the each image frame; (b) effecting optical image stabilization (OIS) for the each image frame to compensate for the detected movement of the camera; and (c) resetting at least one of the lens assembly and the image sensor to a pre-capture position subsequent to the capture of the each image frame. The apparatus is further caused to perform digital image stabilization (DIS) for one or more image frames of the video subsequent to the capture of the series of image frames of the video. The DIS for an image frame from among the one or more image frames is performed based on the movement of the camera detected the image frame and the movement of the camera detected for at least one other image frame from among the series of image frames. The performing of the DIS for the one or more image frames substantially removes an effect of the movement of the camera from the one or more image frames of the video.

Many of the attendant features will be more readily appreciated, as the same becomes better understood by reference to the following detailed description considered in connection with the accompanying drawings.

DESCRIPTION OF THE DRAWINGS

The present description will be better understood from the following detailed description read in light of the following accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Figure 1:
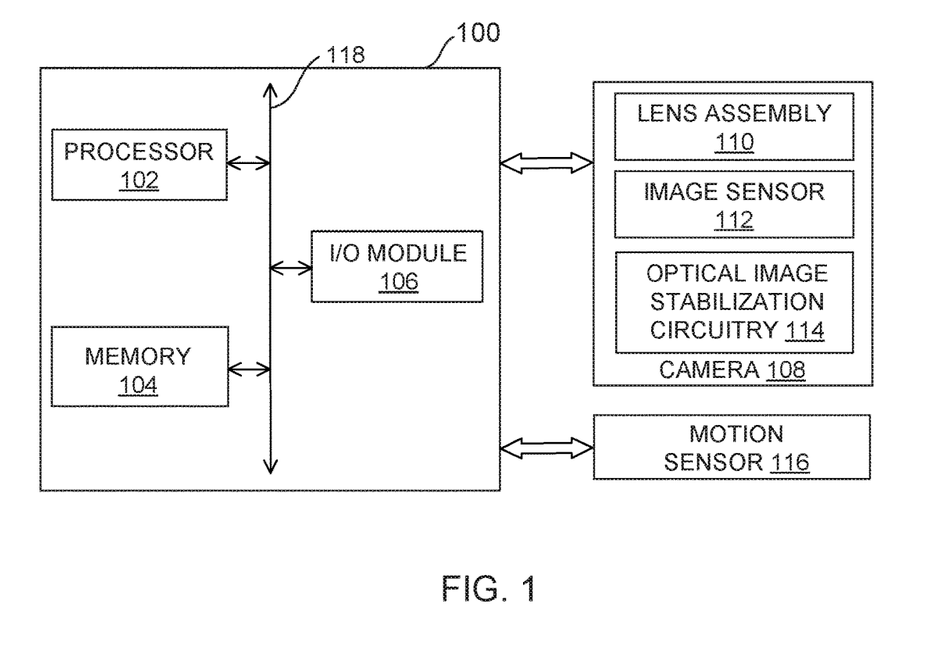
FIG. 1 is a block diagram showing an apparatus, in accordance with an example embodiment.

FIG. 1 is a block diagram showing an apparatus 100, in accordance with an example embodiment. In at least one example embodiment, the apparatus 100 includes a processor for example, a processor 102, and at least one memory for example, a memory 104. The memory 104 is capable of storing machine executable instructions. Further, the processor 102 is capable of executing the stored machine executable instructions. The processor 102 may be embodied in a number of different ways. In an embodiment, the processor 102 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In at least one example embodiment, the processor 102 utilizes computer program code to cause the apparatus 100 to perform one or more actions.

The memory 104 may be embodied as one or more volatile memory devices, one or more non-volatile memory devices or a combination of one or more volatile memory devices and non-volatile memory devices. For example, the memory 104 may be embodied as magnetic storage devices (such as hard disk drives, floppy disks, magnetic tapes, etc.), optical magnetic storage devices (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash ROM, RAM (random access memory), etc.).

The apparatus 100 further includes an input/output (I/O) module 106 configured to enable the apparatus 100 to receive input and provide output. For example, the I/O module 106 may receive an input of a series of image frames corresponding to a video captured by a camera and generate an output configured to cause a display of the video on a display screen of an electronic device. To that effect, the I/O module 106 may be in operative communication with at least one camera, such as a camera 108. The camera 108 may include hardware and/or software necessary for capturing one or more image frames. For example, the camera 108 may include hardware, such as a lens assembly 110 including one or more lens, and, an image sensor 112. Examples of the image sensor 112 may include, but are not limited to, a complementary metal-oxide semiconductor (CMOS) image sensor, a charge-coupled device (CCD) image sensor, a backside illumination sensor (BSI) and the like. In some embodiments, the camera 108 may include only the hardware for capturing a series of image frames of a video, while a memory device of the apparatus 100 stores instructions for execution by the processor 102 in the form of software for generating an output video stream from the captured video. In an example embodiment, the camera 108 may further include a processing element such as a co-processor that assists the processor 102 in processing image frame data and an encoder and/or decoder for compressing and/or decompressing image frame data. The encoder and/or decoder may encode and/or decode according to a standard format, for example, a Joint Photographic Experts Group (JPEG) standard format. In an embodiment, the camera 108 may include an optical image stabilization (OIS) circuitry 114 configured to effect OIS of captured image frames as will be explained later with reference to FIG. 2.

In an example embodiment, the I/O module 106 may be in operative communication with at least one motion sensor, such as a motion sensor 116. The motion sensor 116 is configured to detect movement of the camera 108 during capture of the image frames. In an example embodiment, the motion sensor 116 may be a gyroscope capable of sensing a rotational velocity of the camera 108 in one or more directions. It is understood that an implementation of the motion sensor 116 as a gyroscope is mentioned herein for illustration purposes only and that the motion sensor 116 may be implemented as various other inertial measurement units (IMU), such as for example an accelerometer.

In FIG. 1, the camera 108 and the motion sensor 116 are depicted to be in operative communication with the apparatus 100, however in some embodiments, the camera 108 and the motion sensor 116 may be included within the apparatus 100. In some example embodiments, the camera 108 and the motion sensor 116 may be included within an electronic device housing the apparatus 100. Examples of the electronic device may include, but are not limited to, a camera device, a mobile phone, a laptop computer, a tablet computer, a media player, a video recorder, a video conferencing system, a wearable device equipped with image/video capture capabilities, and the like. Alternatively, in some embodiments, the camera 108 and the motion sensor 116 may be disposed external to the electronic device and may be operatively coupled to the apparatus 100 housed within the electronic device.

In an embodiment, the I/O module 106 is further configured to be in operative communication with a user interface (UI), such as a display screen of the electronic device. Examples of the display screen may include, but are not limited to, a light emitting diode display screen, a thin-film transistor (TFT) display screen, a liquid crystal display screen, an active-matrix organic light-emitting diode (AMO-LED) display screen and the like.

In at least one example embodiment, the various components of the apparatus 100, such as the processor 102, the memory 104 and the I/O module 106 may communicate with each other via a centralized circuit system 118. The centralized circuit system 118 may be various devices configured to, among other things, provide or enable communication between the components of the apparatus 100. In certain embodiments, the centralized circuit system 118 may be a central printed circuit board (PCB) such as a motherboard, a main board, a system board, or a logic board. The centralized circuit system 118 may also, or alternatively, include other printed circuit assemblies (PCAs) or communication channel media.

It is noted that the apparatus 100 may include fewer or more components than those depicted in FIG. 1. In an embodiment, one or more components of the apparatus 100 may be implemented as a set of software layers on top of existing hardware systems. In an exemplary scenario, the apparatus 100 may be any machine capable of executing a set of instructions (sequential and/or otherwise) so as to stabilize video content by substantially removing camera motion induced artefacts from the image frames configuring the video content. Moreover, the stabilized video content may provide a pleasant and enjoyable viewing experience to a viewer of the video content. It is noted that the term 'video content' and 'video' are used interchangeably hereinafter.

In at least one example embodiment, the apparatus 100 is configured to cause a capture of a series of image frames of a video by the camera 108. In an illustrative example, a user may provide an input such as for example a touch input on a display screen of an electronic device or an input related to a selection of a physical button on the electronic device to initiate capture of a video. The I/O module 106 may be configured to receive such an input from the user. The I/O module 106 may further be configured to provision the input to the processor 102, which in conjunction with instructions stored in the memory 104, may initiate capture of the video using the camera 108.

In an embodiment, the capture of each image frame of the video involves performing the operations of: (a) detecting movement of the camera 108 during capture of each image frame; (b) effecting optical image stabilization (OIS) for each image frame to compensate for the detected movement of the camera 108; and (c) resetting at least one of the lens assembly 110 and the image sensor 112 to a pre-capture position subsequent to the capture of the each image frame.

In an example embodiment, the motion sensor 116 is configured to detect movement of the camera 108 and measure rotational velocity of the camera 108 in one or more directions, such as for example, directions along an X-axis, a Y-axis and a Z-axis from an initial frame of reference chosen to be an initial orientation of the camera 108 before initiating capture of the video. The measured rotational velocity values (for example, in radians per second) along the three directions may be provisioned by the motion sensor 116 to the I/O module 106.

The I/O module 106 may be configured to provide such information to the processor 102 in substantially real-time to facilitate determination of an extent of movement of the camera 108. The determination of the extent of the movement of the camera 108 may be used to control the OIS circuitry 114 for effecting OIS of an image frame being captured. In an illustrative example, the apparatus 100 may cause the OIS circuitry 114 in the camera 108 to facilitate an effecting of OIS for each image frame capture. The effecting of OIS is further explained with reference to FIG. 2

Figure 2:
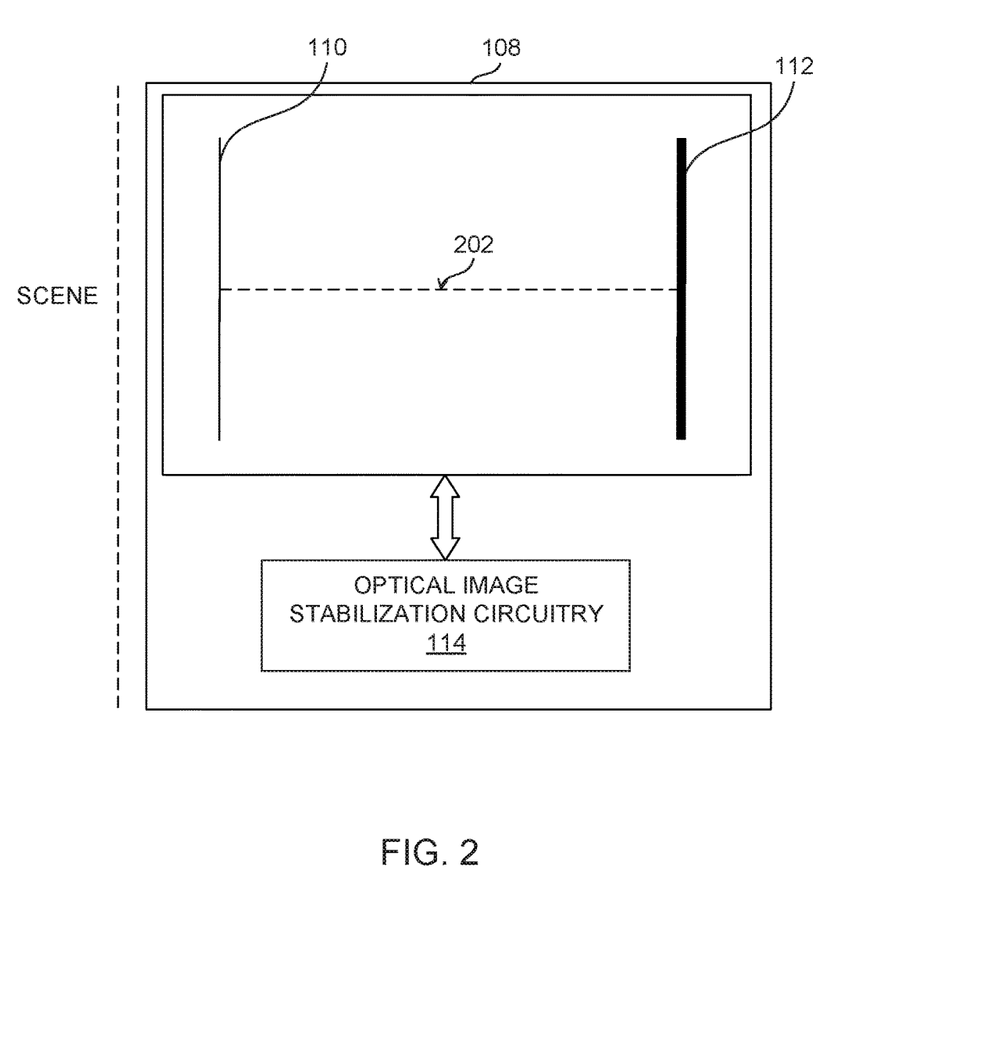
FIG. 2 shows a simplified representation of components of a camera for illustrating an effecting of OIS for each image frame captured by the camera, in accordance with an example embodiment.

FIG. 2 shows a simplified representation of components of the camera 108 for illustrating an effecting of OIS for each image frame captured by the camera 108, in accordance with an example embodiment. In the simplified representation shown in FIG. 2, the camera 108 is depicted to include hardware, such as the lens assembly 110 (exemplarily depicted to be a single lens and hereinafter referred to as lens 110) and the image sensor 112. The camera 108 further includes the OIS circuitry 114. It is understood the camera 108 may include several other components, such as a shutter (for example, a global shutter or a rolling shutter) to capture light reflected and emitted from objects in a scene and enable the passage of the light onto the lens 110. The lens 110 may then be configured to direct the light towards several light-sensitive pixels or sensels of the image sensor 112. The sensels are configured to sense the light and thereby facilitate generation of an image frame corresponding to the scene.

Typically, the lens 110 and the image sensor 112 are aligned within the camera 108 along an optical axis 202. The optical axis is a line along which a rotational symmetry of an optical system such as an optical system including the lens 110 and the image sensor 112 is configured. The alignment of the lens 110 and the image sensor 112 is configured in such a manner that light rays emanating from a particular point in the scene is directed towards a specific sensel on the image sensor 112 by the lens 110. In an embodiment, on account of movement of the camera 108 (for example, on account of a shake of a hand) during image frame capture, a shift in path of the light rays from their intended recipient sensels on the image sensor 112 is observed thereby indicating a shift in the optical axis 202 of the camera 108. The shift in the optical axis 202 of the camera 108 may cause undesirable artefacts like blurred objects in the captured image frames.

As explained with reference to FIG. 1, the I/O module 106 of the apparatus 100 is configured to receive detected movement of the camera 108 from the motion sensor 116. In an embodiment, the processor 102 may be configured to determine an extent of the movement of the camera 108 from the rotational velocities recorded in one or more directions and thereafter control the OIS circuitry 114 in the camera 108 such that the optical axis 202 of the camera 108 is translated or moved to compensate for a detected movement of the camera 108 during the capture of the each image frame. The shifting of the optical axis 202 may be performed to regain an alignment of the lens 110 and the image sensor 112, thereby negating the movement of the camera 108, and enabling capture of sharper image frames corresponding to the video. It is understood that the OIS circuitry 114 may include one or more actuators to move at least one of the lens 110 and the image sensor 112 to shift the optical axis 202 of the camera 108. In some embodiments, an entire image capture package including the lens 110 and the image sensor 112 may be rotated in a direction opposite to the detected movement of the camera 108 to cause a shift in the optical axis 202 and thereby achieve optical image stabilization.

In an embodiment, the apparatus 100 may be caused to determine an extent of the detected movement of the camera 108 during an image frame capture in terms of movement in the horizontal direction, for example, H°, and a movement in the vertical direction, for example Y°. Accordingly, the shift in the optical axis 202 or the translation of the lens 110/image sensor 112 may be configured to be a function of (H°, Y°) in order to compensate for the detected movement of the camera 108.

In an embodiment, upon completion of the image frame capture, at least one of the lens 110 and the image sensor 112 is reset to an initial pre-capture position, i.e. an aligned position of the lens 110 and the image sensor 112 configured prior to the camera movement and the subsequent shifting of the optical axis. Further, the OIS may be performed for each image frame captured corresponding to the video and thereafter the lens 110 and/or the image sensor 112 may be reset to the original position subsequent to the capture of the each image frame. Such a process may be followed for each image frame captured corresponding to the video. It is noted that performing OIS for each image frame results in capture of sharper image frames in the captured content as exemplarily explained with reference to FIGS. 3A and 3B.

Figure 3A:
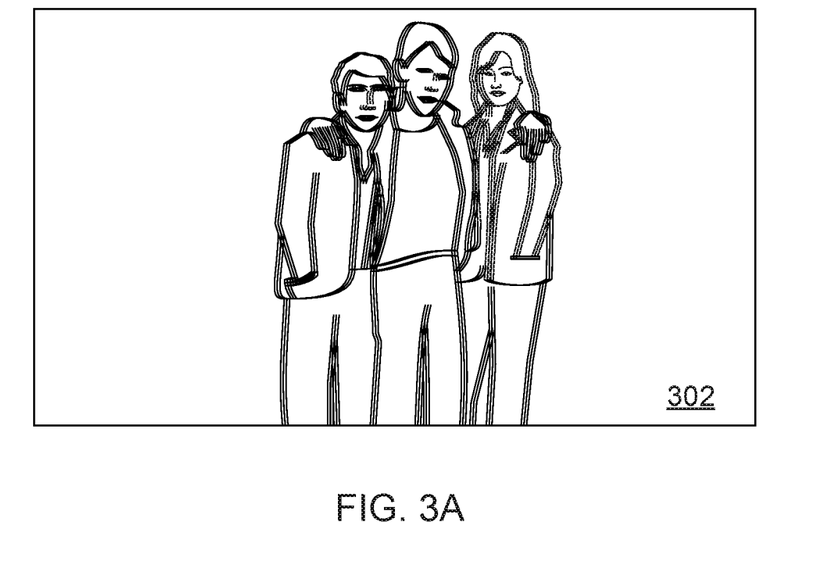
FIG. 3A shows an example image frame of a video captured without effecting OIS, in accordance with an example scenario.
Figure 3B:
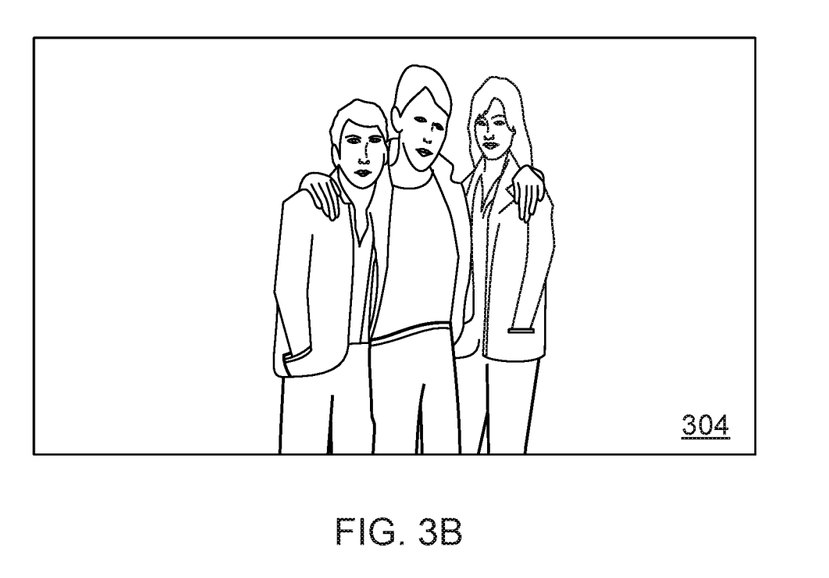
FIG. 3B shows an example image frame of a video captured using OIS, in accordance with an example embodiment.

FIG. 3A shows an example image frame 302 of a video captured without effecting OIS, in accordance with an example scenario. The image frame 302 corresponds to a series of image frames of a video captured with camera movement during image frame capture. As a result, one or more image frames of the video exhibit blurred objects as exemplarily depicted in FIG. 3A. More specifically, the image frame 302 displays three individuals posing for a camera, such as the camera 108. If while capturing a video of the three individuals, the camera undergoes movement, then the resulting video may include image frames, which will show distorted or blurred images of the three individuals as exemplarily depicted in the image frame 302. However, if an optical image stabilization is effected for each image frame during its respective capture, then the camera motion induced motion blur may be substantially reduced and the resulting video may include sharper image frames, such as the image frame 304 shown in FIG. 3B. More specifically, FIG. 3B shows an example image frame 304 of a video captured using OIS, in accordance with an example embodiment. As can be seen in FIG. 3B, the image frame 304 is noticeably sharper and does not include any distorting artefacts typically seen in image frames captured with camera motion, such as the image frame 302.

It is noted that effecting OIS on a per-frame basis for each image frame of the captured video may compensate for minor movement of the camera, such as for example, a shake of a hand, while capturing the image frames. However, for relatively major movements of the camera, such as for example a sweeping motion or a panning motion of the camera while capturing of the image frames, a shifting of the optical axis may approach its mechanical limit and as such may be incapable of compensating such unwanted movements of the camera during image-frame capture. Some illustrative examples of relatively major movements of the camera are shown in FIGS. 4A and 4B.

Figure 4A:
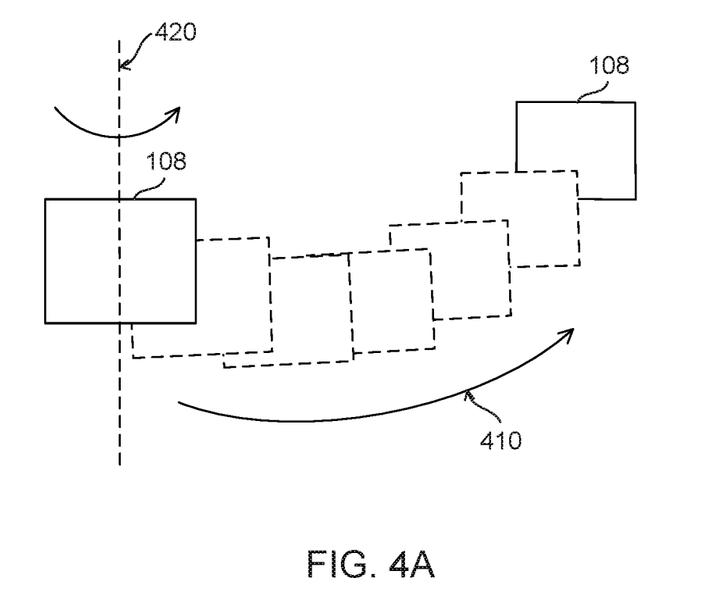
FIG. 4A depicts a panning motion of the camera while capturing a series of image frames of a video, in accordance with an example scenario.

FIG. 4A depicts a panning motion of the camera 108 while capturing a series of image frames of a video, in accordance with an example scenario. As explained with reference to FIGS. 1 and 2, a user may, intentionally or otherwise, pan the camera 108, while capturing a video. FIG. 4A depicts an example path 410 traced by the camera 108 during video capture. As such, the path 410 involves a rotation of the camera 108 around an imaginary axis 420.

Figure 4B:
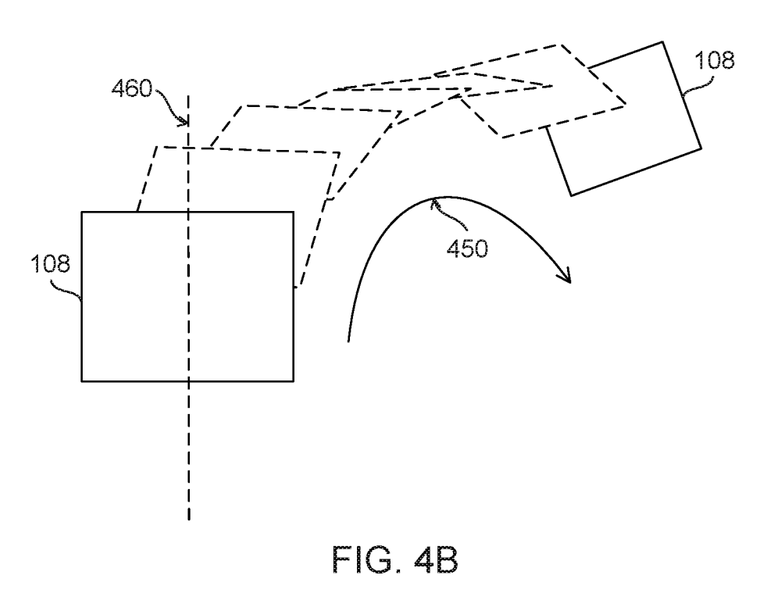
FIG. 4B depicts a tilting motion of the camera while capturing a series of image frames of a video, in accordance with another example scenario.

FIG. 4B depicts a tilting motion of the camera 108 while capturing a series of image frames of a video, in accordance with another example scenario. In an illustrative example, a user may, intentionally or otherwise, tilt the camera 108, while capturing a video. FIG. 4B depicts an example path 450 traced by the camera 108 during video capture. As such, the path 450 involves a rotation of the camera 108 around an imaginary axis 460.

In many example scenarios, the rotation experienced by the camera 108, such as for example while tracing the path 420 shown in FIG. 4A or the path 450 shown in FIG. 4B, may be in excess of 15 degrees, which may be difficult to compensate using OIS on account of mechanical limitations of optical axis rotation. As a result, the individual image frames may still be sharper on account of effecting of OIS and resetting the lens assembly and/or the image sensor to a pre-capture position after each image-frame capture, however, the overall video may be distorted or shaky.

Referring now to FIG. 1, as explained, the I/O module 106 of the apparatus 100 is configured to receive motion sensor data from the motion sensor 116. In an illustrative example, the motion sensor 116 may be embodied as a gyroscope and configured to capture information related to camera's rotation around the X-axis, Y-axis and Z-axis from an initial frame of reference chosen to be the camera's orientation at the time of initiating capture of the series of image frames. Such information captured by a motion sensor, such as the gyroscope, is referred to herein as the motion sensor data. The I/O module 106 may be configured to receive the motion sensor data related to camera motion sensed by at least one motion sensor, such as the gyroscope, during an entire time duration of the capture of the series of image frames of the video and provision such information, in an ongoing manner, to the memory 104 for storage of the motion sensor data.

In at least one example embodiment, the apparatus 100 may be caused to perform digital image stabilization (DIS) for one or more image frames of the video subsequent to the capture of the series of image frames of the video. For example, if a sequence of image frames captured by the camera 108 includes image frame 1 to image frame 10, then one or more image frames from among the ten image frames may be subjected to DIS subsequent to the capture of all the image frames.

In at least one example embodiment, the DIS for an image frame is performed based on the movement of the camera 108 detected for the image frame and the movement of the camera 108 detected for at least one other image frame from among the series of image frames. In an illustrative example, for performing the DIS for an image frame, for example image frame 5, detected movement of the camera 108 for the image frame 5 and the detected movement of the camera 108 for at least one other image frame, such as one or more image frames captured prior to the capture of the image frame 5, for example image frames 1, 2, 3 and/or 4, or one or more image frames captured subsequent to the capture of the image frame 5 (such image frames are also referred to herein as 'future image frames'), such as for example, image frames 6, 7, 9 etc., may be utilized.

In an embodiment, a path likely traversed by the camera 108 till the capture of the image frame 5 may be determined using the movement of the camera 108 detected for the image frame and movement of the camera 108 detected for at least one other image frame. In another illustrative example, a path likely traversed by the camera 108, such as the path 410 shown in FIG. 4A or the path 450 shown in FIG. 4B, may be determined based on the detected movement of the camera 108 for the image frame 5 and one or more other image frames. In some embodiments, the rotational velocity values in one or more directions signifying the movement of the camera 108 during image capture may be utilized by the processor 102 of the apparatus 100 to determine a path likely traversed by the camera 108.

In at least one example embodiment, in order to perform digital image stabilization on one or more image frames of the video, the processor 102 may be configured to digitally shift pixels in the one or more image frames to smoothen the path traversed by the camera 108 till respective image frame capture. In an illustrative example, if the path of the camera 108 is indicative of a motion of the camera 108 from left to right, then the processor 102 may be configured to shift pixels, appropriately, from right to left to smoothen the path traversed by the camera 108. The shift may be performed selectively and only for affected pixels, for example pixels associated with object edges, which experience motion blur effect. Moreover, the amount of shift to be performed for the selected pixels may be determined based on determination of the motion blur observed in the captured image frames. In at least one example embodiment, known algorithms, such as for example, Richardson Lucy algorithm may be utilized to compute point spread function (PSF) and motion blur therefrom. The amount of shift to be imparted digitally to the affected pixels may be determined based on the motion blur computed by the processor 102. It is noted that the DIS is performed for the one or more image frames of the video, which were captured by effecting OIS during their respective capture and as such include reduced distorting artefacts, typically seen in image frames captured without OIS.

It is understood that performing the DIS subsequent to the capture of the series of image frames is preferable as the path likely traversed by the camera 108 may be determined more accurately with availability of information related to the movement of the camera 108 for more number of image frames (including future image frames), thereby aiding in effective compensation of the path traversed by the camera 108 in the one or more image frames.

As explained with reference to FIG. 1, the effect of the camera motion comprises blurring artefacts observed in several image frames on account of the camera motion during the capture of the series of image frames. In at least one example embodiment, the digital image stabilization is configured to substantially remove the effect of the camera motion from the one or more image frames of the video, thereby resulting in sharper image frames corresponding to the video. The term 'substantially removing the effect of camera motion' as used herein implies removing, preferably completely, of the effects of unwanted camera movement during image frame to an extent that the distorting artefacts are no longer noticeable by naked eye to a viewer. It is understood that a stabilized video including sharper image frames, such as the image frame 304, provides a pleasant viewing experience to a viewer. A flow diagram for video content stabilization is depicted in FIG. 5.

Figure 5:
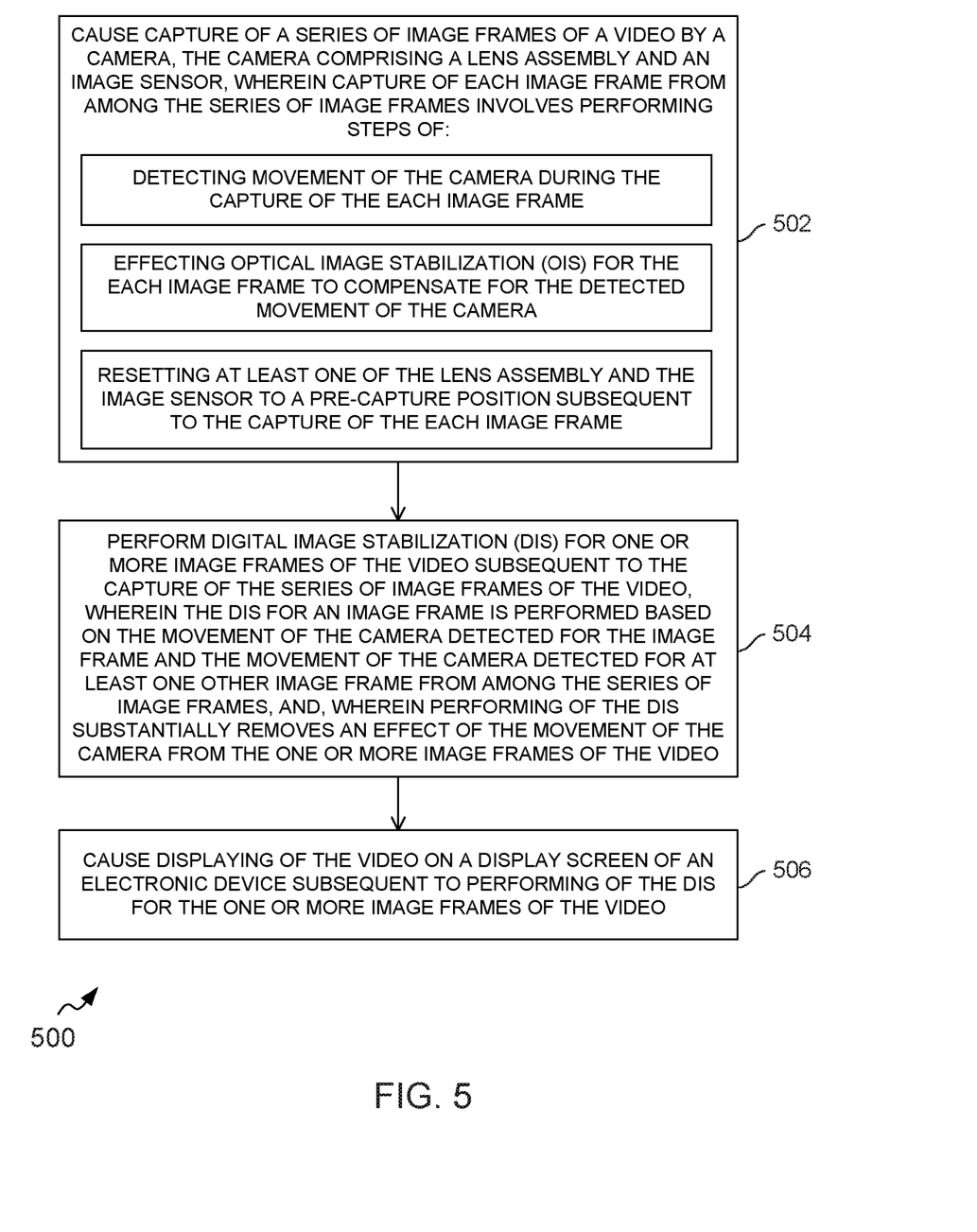
FIG. 5 illustrates an example flow diagram of a method for video content stabilization, in accordance with an example embodiment.

FIG. 5 illustrates an example flow diagram of a method 500 for video content stabilization, in accordance with an example embodiment. Operations of the method 500 may be performed by, among other examples, the apparatus 100 of FIG. 1.

At 502, the method 500 includes causing capture of a series of image frames of a video by a camera. The camera includes a lens assembly and an image sensor. The capture of each image frame of the video involves performing the operations of: (a) detecting movement of the camera during capture of each image frame; (b) effecting optical image stabilization (OIS) for each image frame to compensate for the detected movement of the camera; and (c) resetting at least one of the lens assembly and the image sensor to a pre-capture position subsequent to the capture of the each image frame. As explained with reference to FIG. 1, a motion sensor (such as the motion sensor 116) may be configured to detect movement of the camera. More specifically, the motion sensor may be configured to measure a rotational velocity of the camera in one or more directions, such as for example, directions along an X-axis, a Y-axis and a Z-axis from an initial frame of reference chosen to be an initial orientation of the camera before initiating capture of the video. The measured rotational velocity values (for example, in radians per second) along the three directions may be utilized to determine an extent of movement of the camera in substantially real-time. The determination of the extent of the movement of the camera may be used to control an OIS circuitry, such as the OIS circuitry 114 explained with reference to FIG. 2, for effecting OIS of an image frame being captured.

Further, upon completion of the image frame capture at least one of the lens assembly and the image sensor is reset to an initial pre-capture position, i.e. an aligned position of the lens assembly and the image sensor configured prior to the camera movement and the subsequent shifting of the optical axis. Further, the OIS may be performed for each image frame captured corresponding to the video and thereafter the lens assembly and/or the image sensor may be reset to the original position subsequent to the capture of the each image frame. Such a process may be followed for each image frame captured corresponding to the video.

At 504, the method 500 includes performing digital image stabilization for one or more image frames of the video subsequent to the capture of the series of image frames of the video. In at least one example embodiment, the DIS for an image frame is performed based on the movement of the camera detected for the image frame and the movement of the camera detected for at least one other image frame from among a series of image frames. As explained with reference to FIG. 1, a path likely traversed by a camera till the capture of the image frame may be determined using the movement of the camera detected for the image frame and movement of the camera detected for at least one other image frame from among the captured image frames. The DIS for the image frame is performed by digitally shifting pixels to electronically compensate for the path traversed by the camera during image-frame capture. The digital image stabilization is configured to substantially remove an effect of the camera motion from the one or more image frames of the video, thereby resulting in stabilized video content. At 506, the method 500 includes displaying the video including the series of image frames to a viewer (e.g., on a display screen of an electronic device associated with the viewer), subsequent to substantially removing the effect of the camera motion from the one or more image frames of the video.

The disclosed method 500 can be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer or image processor embedded in a device, such as a laptop computer, entertainment console, net book, web book, tablet computing device, smart phone, or other mobile computing device). Such software can be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems can also be stored on one or more computer-readable media (e.g., non-transitory computer-readable media) and are considered to be within the scope of the disclosed technology. Furthermore, any of the software-based embodiments can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Figure 6:
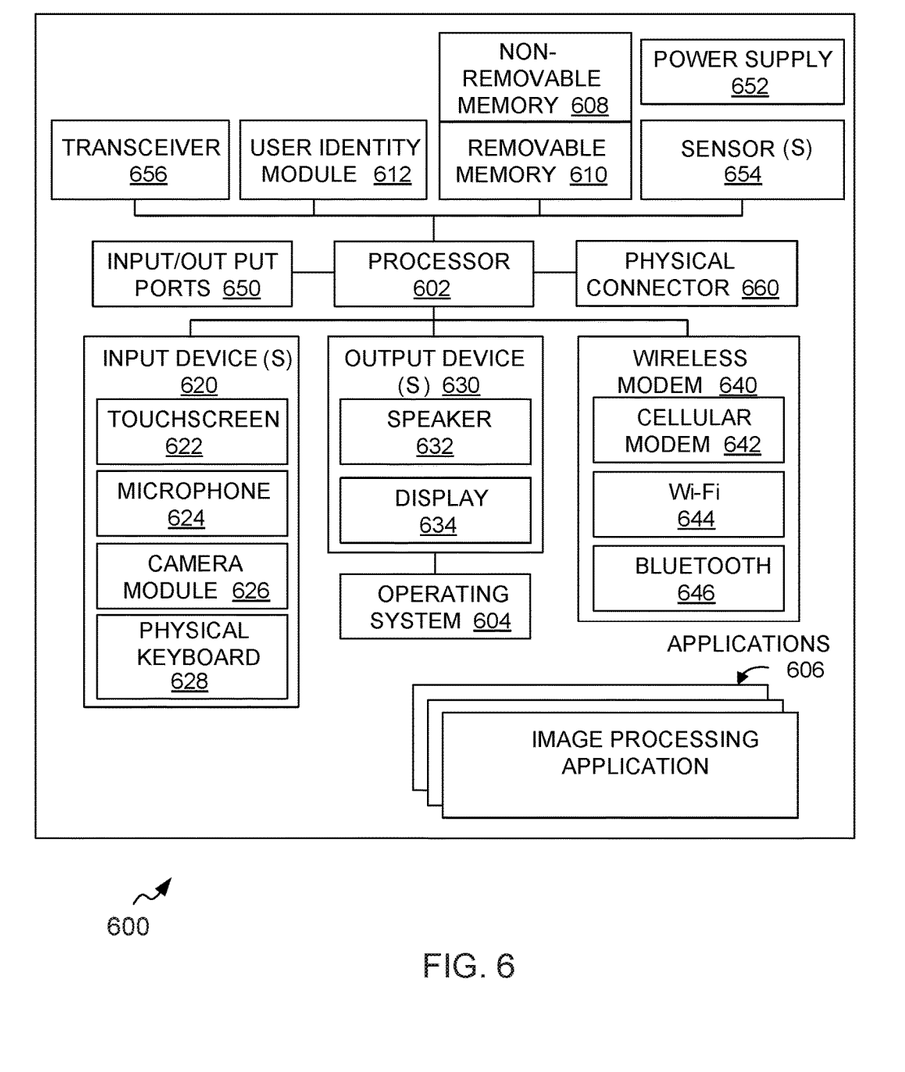
FIG. 6 illustrates an example of a mobile device capable of implementing example embodiments described herein.

Referring now to FIG. 6, a schematic block diagram of a mobile device 600 is shown that is capable of implementing embodiments of techniques for video content stabilization as described herein. It should be understood that the mobile device 600 as illustrated and hereinafter described is merely illustrative of one type of device and should not be taken to limit the scope of the embodiments. As such, it should be appreciated that at least some of the components described below in connection with the mobile device 600 may be optional and thus in an example embodiment may include more, less or different components than those described in connection with the example embodiment of FIG. 6. As such, among other examples, the mobile device 600 could be any of device from among mobile electronic devices, such as for example, personal digital assistants (PDAs), mobile televisions, gaming devices, cellular phones, tablet computers, laptops, mobile computers, cameras, mobile digital assistants, or any combination of the aforementioned, and other types of communication or multimedia devices.

The illustrated mobile device 600 includes a controller or a processor 602 (e.g., a signal processor, microprocessor, ASIC, or other control and processing logic circuitry) for performing tasks such as signal coding, data processing, image processing, input/output processing, power control, and/or other functions. An operating system 604 controls the allocation and usage of the components of the mobile device 600 and support for one or more applications programs (see, applications 606), configured to support video content stabilization, that implements one or more of the innovative features described herein. In addition to video capture application; the application programs may include common mobile computing applications (e.g., telephony applications, email applications, calendars, contact managers, web browsers, messaging applications) or any other computing application.

The illustrated mobile device 600 includes one or more memory components, for example, a non-removable memory 608 and/or removable memory 610. The non-removable memory 608 can include RAM, ROM, flash memory, a hard disk, or other well-known memory storage technologies. The removable memory 610 can include flash memory, smart cards, or a Subscriber Identity Module (SIM). The one or more memory components can be used for storing data and/or code for running the operating system 604 and the applications 606. Examples of data can include web pages, text, images, sound files, image data, video data, or other data sets to be sent to and/or received from one or more network servers or other devices via one or more wired or wireless networks. The mobile device 600 may further include a user identity module (UIM) 612. The UIM 612 may be a memory device having a processor built in. The UIM 612 may include, for example, a SIM, a universal integrated circuit card (UICC), a universal subscriber identity module (USIM), a removable user identity module (R-UIM), or any other smart card. The UIM 612 typically stores information elements related to a mobile subscriber. The UIM 612 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The mobile device 600 can support one or more input devices 620 and one or more output devices 630. Examples of the input devices 620 may include, but are not limited to, a touch screen 622 (e.g., capable of capturing finger tap inputs, finger gesture inputs, multi-finger tap inputs, multi-finger gesture inputs, or keystroke inputs from a virtual keyboard or keypad), a microphone 624 (e.g., capable of capturing voice input), a camera module 626 (e.g., capable of capturing still picture images and/or video image frames) and a physical keyboard 628. Examples of the output devices 630 may include, but are not limited to a speaker 632 and a display 634. Other possible output devices (not shown) can include piezoelectric or other haptic output devices. Some devices can serve more than one input/output function. For example, the touch screen 622 and the display 634 can be combined into a single input/output device.

In an embodiment, the camera module 626 may include a digital camera capable of forming a video stream from a captured video. In some implementations, the camera module 626 may include two or more cameras, for example, a front camera and a rear camera positioned on two sides of the mobile device 600 (e.g., in a mobile device). As such, the camera module 626 includes all hardware, such as a lens or other optical component(s), and software for creating a video stream from a captured video. Alternatively, the camera module 626 may include the hardware needed to view the video, while a memory device of the mobile device 600 stores instructions for execution by the processor 602 in the form of software to create a video stream from a captured video. In an example embodiment, the camera module 626 may further include a processing element such as a co-processor, which assists the processor 602 in processing image frame data and an encoder and/or decoder for compressing and/or decompressing image data. In an embodiment, the camera module 626 may provide live image data (viewfinder image data) to the display 634.

A wireless modem 640 can be coupled to one or more antennas (not shown in FIG. 6) and can support two-way communications between the processor 602 and external devices, as is well understood in the art. The wireless modem 640 is shown generically and can include, for example, a cellular modem 642 for communicating at long range with the mobile communication network, a Wi-Fi-compatible modem 644 for communicating at short range with an external Bluetooth-equipped device or a local wireless data network or router, and/or a Bluetooth-compatible modem 646. The wireless modem 640 is typically configured for communication with one or more cellular networks, such as a GSM network for data and voice communications within a single cellular network, between cellular networks, or between the mobile device and a public switched telephone network (PSTN).

The mobile device 600 can further include one or more input/output ports 650, a power supply 652, one or more sensors 654 for example, an accelerometer, a gyroscope, a compass, or an infrared proximity sensor for detecting the orientation or motion of the mobile device 600, a transceiver 656 (for wirelessly transmitting analog or digital signals) and/or a physical connector 660, which can be a USB port, IEEE 1394 (FireWire) port, and/or RS-232 port. The illustrated components are not required or all-inclusive, as any of the components shown can be deleted and other components can be added.

With the image frame processing applications and/or other software or hardware components, the mobile device 600 can implement the technologies described herein. For example, the processor 602 can facilitate capture of series of image frames of a scene through the camera module 626 and perform post-processing of the captured series of image frames.

Although the mobile device 600 is illustrated in FIG. 6 in form of a smartphone, but more particularly, the techniques and solutions described herein can be implemented with connected devices having other screen capabilities and device form factors, such as a tablet computer, a virtual reality device connected to a mobile or desktop computer, an image sensor attached to a gaming console or television, and the like.

An embodiment of a method comprises causing capture of a series of image frames of a video by a camera, the camera comprising a lens assembly and an image sensor, wherein capture of each image frame from among the series of image frames involves performing operations of:
   detecting a movement of the camera during the capture of the each image frame;
   effecting optical image stabilization (OIS) for the each image frame to compensate for the detected movement of the camera; and
   resetting at least one of the lens assembly and the image sensor to a pre-capture position subsequent to the capture of the each image frame; and
the method further comprises:
   performing digital image stabilization (DIS) for one or more image frames of the video subsequent to the capture of the series of image frames of the video, wherein the DIS for an image frame from among the one or more image frames is performed based on the movement of the camera detected for the image frame and the movement of the camera detected for at least one other image from among the series of image frames, and, wherein performing of the DIS for the one or more image frames substantially removes an effect of the movement of the camera from the one or more image frames of the video.

In one embodiment the method comprises causing displaying of the video on a display screen of an electronic device subsequent to performing of the DIS for the one or more image frames of the video.

In one embodiment of the method, alternatively or in addition, effecting the OIS for the each image frame comprises shifting an optical axis to regain an alignment of the lens assembly and the image sensor, wherein the shifting of the optical axis compensates for the detected movement of the camera during the capture of the each image frame.

In one embodiment of the method, alternatively or in addition, the detected movement of the camera comprises rotational movement of the camera in one or more directions.

In one embodiment of the method, alternatively or in addition, the method further comprises determining a path likely traversed by the camera till the capture of the image frame, the path determined from the movement of the camera detected for the image frame and the movement of the camera detected for the at least one other image frame, wherein the DIS for the image frame is configured to electronically compensate an effect of the path likely traversed by the camera in the image frame.

In one embodiment of the method, alternatively or in addition, the effect of the movement of the camera during the capture of the series of image frames comprises blurring artefacts observed in at least one image frame of the video.

In one embodiment of the method, alternatively or in addition, the movement of the camera during the capture of the series of image frames is detected using a gyroscope configured to measure a rotational velocity of the camera in one or more directions.

An aspect of an apparatus comprises:
   at least one processor; and
   at least one memory comprising computer program code, the at least one memory and the computer program code configured to, with the at least one processor, cause the apparatus to at least perform:
   cause capture of a series of image frames of a video by a camera, the camera comprising a lens assembly and an image sensor, wherein capture of each image frame from among the series of image frames involves performing operations of:
      detecting a movement of the camera during the capture of the each image frame;
      effecting optical image stabilization (OIS) for the each image frame to compensate for the detected movement of the camera; and
      resetting at least one of the lens assembly and the image sensor to a pre-capture position subsequent to the capture of the each image frame; and
   perform digital image stabilization (DIS) for one or more image frames of the video subsequent to the capture of the series of image frames of the video, wherein the DIS for an image frame from among the one or more image frames is performed based on the movement of the camera detected for the image frame and the movement of the camera detected for at least one other image frame from among the series of image frames, and, wherein performing of the DIS for the one or more image frames substantially removes an effect of the movement of the camera from the one or more image frames of the video.

In one embodiment the apparatus is further caused, at least in part to:
   display the video on a display screen of an electronic device subsequent to performing of the DIS for the one or more image frames of the video.

In one embodiment, alternatively or in addition, the apparatus is further caused, at least in part to:
   effect the OIS for the each image frame by shifting an optical axis to regain an alignment of the lens assembly and the image sensor, wherein the shifting of the optical axis compensates for the detected movement of the camera during the capture of the each image frame.

In one embodiment of the apparatus, alternatively or in addition, the detected movement of the camera comprises rotational movement of the camera in one or more directions.

In one embodiment, alternatively or in addition, the apparatus is further caused, at least in part to:
  determine a path likely traversed by the camera till the capture of the image frame, the path determined from the movement of the camera detected for the image frame and the movement of the camera detected for the at least one other image frame, wherein the DIS for the image frame is configured to electronically compensate an effect of the path likely traversed by the camera in the image frame.

In one embodiment of the apparatus, alternatively or in addition, the effect of the movement of the camera during the capture of the series of image frames comprises blurring artefacts observed in at least one image frame of the video.

In one embodiment, alternatively or in addition, the apparatus further comprises:
  the camera is configured to capture the video; and
  a motion sensor configured to measure a rotational velocity of the camera in one or more directions.

In one embodiment, alternatively or in addition, the apparatus is an electronic device from among a mobile phone, a smartphone, a laptop, a tablet computer, a personal computer, a camera device, a wearable device and a personal digital assistant.

A second aspect of an apparatus comprises:
  a camera comprising a lens assembly and an image sensor;
  a gyroscope configured to detect movement of the camera during image frame capture;
  at least one processor; and
  at least one memory comprising computer program code, the at least one memory and the computer program code configured to, with the at least one processor, cause the apparatus to at least perform:
    cause capture of a series of image frames of a video by the camera, the capture of each image frame from among the series of image frames involving the operations of:
      detecting a movement of the camera during the capture of the each image frame;
      effecting optical image stabilization (OIS) for the each image frame to compensate for the detected movement of the camera; and
      resetting at least one of the lens assembly and the image sensor to a pre-capture position subsequent to the capture of the each image frame; and
    perform digital image stabilization (DIS) for one or more image frames of the video subsequent to the capture of the series of image frames of the video, wherein the DIS for an image frame from among the one or more image frames is performed based on the movement of the camera detected for the image frame and the movement of the camera detected for at least one other image frame from among the series of image frames, and, wherein performing of the DIS for the one or more image frames substantially removes an effect of the movement of the camera from the one or more image frames of the video.

In one embodiment the second aspect of the apparatus is further caused, at least in part to:
  display the video on a display screen of an electronic device subsequent to performing of the DIS for the one or more image frames of the video.

In one embodiment of the second aspect of the apparatus, alternatively or in addition, the electronic device is one of a mobile phone, a smartphone, a laptop, a tablet computer, a personal computer, a camera device, a wearable device and a personal digital assistant.

In one embodiment of the second aspect of the apparatus, alternatively or in addition, the apparatus is further caused, at least in part to:
  effect the OIS for the each image frame by shifting an optical axis to regain an alignment of the lens assembly and the image sensor, wherein the shifting of the optical axis compensates for the detected movement of the camera during the capture of the each image frame.

In one embodiment of the second aspect of the apparatus, alternatively or in addition, the apparatus is further caused, at least in part to:
  determine a path likely traversed by the camera till the capture of the image frame, the path determined from the movement of the camera detected for the image frame and the movement of the camera detected for the at least one other image frame, wherein the DIS for the image frame is configured to electronically compensate an effect of the path likely traversed by the camera in the image frame.

Various example embodiments offer, among other benefits, techniques for providing a pleasant and comfortable viewing experience to a viewer of the video content. The various embodiments disclosed herein suggest effecting optical image stabilization (OIS) for each image frames to remove effects of minor movements of the camera and thereafter perform digital image stabilization (DIS) using motion sensor data to remove effects of larger movements of the camera during video capture, such as for example a sweeping motion or a panning motion of the camera while capturing image frames of a video. As such, the distortion artefacts caused by camera motion during video capture, even in low-light conditions, are substantially removed, thereby enabling generation of stabilized video content with sharper image frames. A viewer of such video content may be able to view the content without any camera motion induced distortion, thereby providing the viewer with a pleasant and comfortable viewing experience.

It is noted that various example embodiments as described herein may be implemented in a wide variety of devices, network configurations and applications for example, in camera devices, in mobile devices or as part of software imaging applications used in any electronic devices.

Computer executable instructions may be provided using any computer-readable media that is accessible by computing based device. Computer-readable media may include, for example, computer storage media such as memory and communications media. Computer storage media, such as memory, includes volatile and non-volatile, removable and non-removable media implemented in any method or technology for storage of information such as computer readable instructions, data structures, program modules or the like. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media is shown within the computing-based device it will be appreciated that the storage may be distributed or located remotely and accessed via a network or other communication link, for example by using communication interface.

The methods described herein may be performed by software in machine readable form on a tangible storage medium e.g. in the form of a computer program comprising computer program code means adapted to perform all the operations of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method operations may be carried out in any suitable order, or simultaneously.

Alternatively, or in addition, the functionality described herein (such as the image processing instructions) can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs). For example, some or all of the device functionality or method sequences may be performed by one or more hardware logic components.

The embodiments illustrated and described herein as well as embodiments not specifically described herein but within the scope of aspects of the invention constitute exemplary apparatus for capturing image frames of a video and for stabilizing the captured video For example, the elements illustrated and described with reference to FIGS. 1, 2 and 6, when configured, under control of the processor 102 and program code in the memory 104 to perform the operations illustrated and described with reference to FIG. 5, constitute exemplary capturing means 108, 110, 112, 626 for causing capture of a series of image frames of a video by a camera 108, 626, the camera comprising a lens assembly 110 and an image sensor 112, exemplary detection means 116, 654 for detecting a movement of the camera during the capture of the each image frame, exemplary optical image stabilization (OIS) means 114 for effecting optical image stabilization for the each image frame to compensate for the detected movement of the camera, exemplary resetting means 102, 104, 602, 604, 606 for resetting at least one of the lens assembly and the image sensor to a pre-capture position subsequent to the capture of the each image frame, and exemplary digital image stabilization means (DIS) 102, 104, 602, 604, 606, 626 for performing digital image stabilization for one or more image frames of the video subsequent to the capture of the series of image frames of the video, wherein the DIS for an image frame from among the one or more image frames is performed based on the movement of the camera detected for the image frame and the movement of the camera detected for at least one other image frame from among the series of image frames.

It will be understood that the benefits and advantages described above may relate to one embodiment or may relate to several embodiments. The embodiments are not limited to those that solve any or all of the stated problems or those that have any or all of the stated benefits and advantages.

The operations of the methods described herein may be carried out in any suitable order, or simultaneously where appropriate. Additionally, individual blocks may be added or deleted from any of the methods without departing from the spirit and scope of the subject matter described herein. Aspects of any of the examples described above may be combined with aspects of any of the other examples described to form further examples without losing the effect sought.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method, comprising:

causing capture of a series of image frames of a video by a camera, the camera comprising a lens assembly and an image sensor, wherein capture of each image frame from among the series of image frames involves performing operations of:

determining a pre-capture position representing an alignment of the lens assembly and the image sensor, wherein the pre-capture position is a position prior to movement of the camera and a subsequent shifting of an optical axis;

detecting the movement of the camera during the capture of the each image frame;

effecting optical image stabilization (OIS) for the each image frame to compensate for the detected movement of the camera; and resetting at least one of the lens assembly or the image sensor to the pre-capture position subsequent to the capture of the each image frame;

the method further comprises:

performing digital image stabilization (DIS) for one or more image frames of the video subsequent to the capture of the series of image frames of the video, wherein the DIS for an image frame from among the one or more image frames is performed based on the movement of the camera detected for the image frame and the movement of the camera detected for at least one other image from among the series of image frames, and, wherein performing of the DIS for the one or more image frames substantially removes an effect of the movement of the camera from the one or more image frames of the video; and causing displaying of the video on a display screen of an electronic device subsequent to performing the DIS for the one or more image frames of the video.

2. The method of claim 1, wherein effecting the OIS for the each image frame comprises shifting the optical axis to regain the alignment of the lens assembly and the image sensor, wherein the shifting of the optical axis compensates for the detected movement of the camera during the capture of the each image frame.

3. The method of claim 2, wherein the detected movement of the camera comprises rotational movement of the camera in one or more directions.

4. The method of claim 1, further comprising:
determining a path likely traversed by the camera till the capture of the image frame, the path determined from the movement of the camera detected for the image frame and the movement of the camera detected for the at least one other image frame, wherein the DIS for the image frame is configured to electronically compensate an effect of the path likely traversed by the camera in the image frame.

5. The method of claim 1, wherein the effect of the movement of the camera during the capture of the series of image frames comprises blurring artefacts observed in at least one image frame of the video.

6. The method of claim 1, wherein the movement of the camera during the capture of the series of image frames is detected using a gyroscope configured to measure a rotational velocity of the camera in one or more directions.

7. An apparatus comprising:
at least one processor; and
at least one memory comprising computer program code, the at least one memory and the computer program code configured to, with the at least one processor, cause the apparatus to at least perform:
cause capture of a series of image frames of a video by a camera, the camera comprising a lens assembly and an image sensor, wherein capture of each image frame from among the series of image frames involves performing operations of:
determining a pre-capture position representing an alignment of the lens assembly and the image sensor, wherein the pre-capture position is a position prior to a movement of the camera and a subsequent shifting of an optical axis;
detecting the movement of the camera during the capture of the each image frame;
effecting optical image stabilization (OIS) for the each image frame to compensate for the detected movement of the camera; and
resetting at least one of the lens assembly or the image sensor to the pre-capture position subsequent to the capture of the each image frame; and
perform digital image stabilization (DIS) for one or more image frames of the video subsequent to the capture of the series of image frames of the video, wherein the DIS for an image frame from among the one or more image frames is performed based on the movement of the camera detected for the image frame and the movement of the camera detected for at least one other image frame from among the series of image frames, and, wherein performing of the DIS for the one or more image frames substantially removes an effect of the movement of the camera from the one or more image frames of the video.

8. The apparatus of claim 7, wherein the apparatus is further caused, at least in part to:
display the video on a display screen of an electronic device subsequent to performing of the DIS for the one or more image frames of the video.

9. The apparatus of claim 7, wherein the apparatus is further caused, at least in part to:
effect the OIS for the each image frame by shifting the optical axis to regain the alignment of the lens assembly and the image sensor, wherein the shifting of the optical axis compensates for the detected movement of the camera during the capture of the each image frame.

10. The apparatus of claim 9, wherein the detected movement of the camera comprises rotational movement of the camera in one or more directions.

11. The apparatus of claim 7, wherein the apparatus is further caused, at least in part to:
determine a path likely traversed by the camera till the capture of the image frame, the path determined from the movement of the camera detected for the image frame and the movement of the camera detected for the at least one other image frame, wherein the DIS for the image frame is configured to electronically compensate an effect of the path likely traversed by the camera in the image frame.

12. The apparatus of claim 7, wherein the effect of the movement of the camera during the capture of the series of image frames comprises blurring artefacts observed in at least one image frame of the video.

13. The apparatus of claim 7, further comprising:
the camera is configured to capture the video; and
a motion sensor configured to measure a rotational velocity of the camera in one or more directions.

14. The apparatus of claim 13, wherein the apparatus is an electronic device from among a mobile phone, a smartphone, a laptop, a tablet computer, a personal computer, a camera device, a wearable device and a personal digital assistant.

15. An apparatus comprising:
a camera comprising a lens assembly and an image sensor;
a gyroscope configured to detect movement of the camera during image frame capture;
at least one processor; and
at least one memory comprising computer program code, the at least one memory and the computer program code configured to, with the at least one processor, cause the apparatus to at least perform:
cause capture of a series of image frames of a video by the camera, the capture of each image frame from among the series of image frames involving the operations of:
determining a pre-capture position representing an alignment of the lens assembly and the image sensor, wherein the pre-capture position is a position prior to a movement of the camera and a subsequent shifting of a optical axis;
detecting the movement of the camera during the capture of the each image frame;
effecting optical image stabilization (OIS) for the each image frame to compensate for the detected movement of the camera; and
resetting at least one of the lens assembly or the image sensor to the pre-capture position subsequent to the capture of the each image frame; and
perform digital image stabilization (DIS) for one or more image frames of the video subsequent to the capture of the series of image frames of the video, wherein the DIS for an image frame from among the one or more image frames is performed based on the movement of the camera detected for the image frame and the movement of the camera detected for at least one other image frame from among the series of image frames, and, wherein performing of the DIS for the one or more image frames substantially removes an effect of the movement of the camera from the one or more image frames of the video.

16. The apparatus of claim 15, wherein the apparatus is further caused, at least in part to:
   display the video on a display screen of an electronic device subsequent to performing of the DIS for the one or more image frames of the video.

17. The apparatus of claim 16, wherein the electronic device is one of a mobile phone, a smartphone, a laptop, a tablet computer, a personal computer, a camera device, a wearable device and a personal digital assistant.

18. The apparatus of claim 15, wherein the apparatus is further caused, at least in part to:
   effect the OIS for the each image frame by shifting the optical axis to regain the alignment of the lens assembly and the image sensor, wherein the shifting of the optical axis compensates for the detected movement of the camera during the capture of the each image frame.

19. The apparatus of claim 15, wherein the apparatus is further caused, at least in part to:
   determine a path likely traversed by the camera till the capture of the image frame, the path determined from the movement of the camera detected for the image frame and the movement of the camera detected for the at least one other image frame, wherein the DIS for the image frame is configured to electronically compensate an effect of the path likely traversed by the camera in the image frame.

20. The apparatus of claim 15, wherein the movement of the camera during the capture of the series of image frames is detected using a gyroscope configured to measure a rotational velocity of the camera in one or more directions.

* * * * *